UNITED STATES PATENT OFFICE.

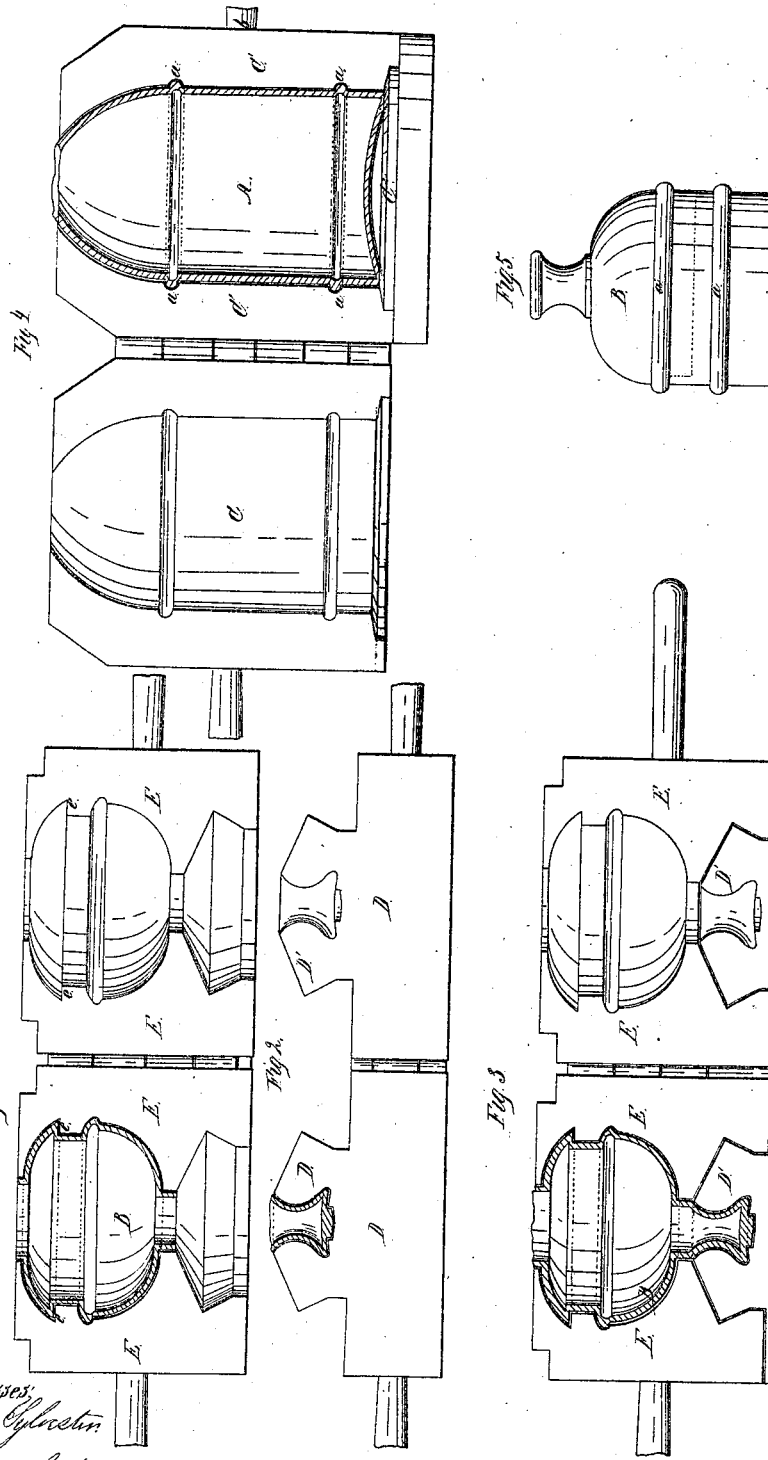

JAMES S. ATTERBURY AND THOS. B. ATTERBURY, OF PITTSBURG, PA.

IMPROVED PROCESS OF MAKING RING-JARS.

Specification forming part of Letters Patent No. 59,159, dated October 30, 1866; antedated August 30, 1866.

*To all whom it may concern:*

Be it known that we, JAMES S. ATTERBURY and THOMAS B. ATTERBURY, of Pittsburg, in the county of Allegheny and State of Pennsylvania, have invented a new Mode of Making Ring-Jars; and we do hereby declare that the following is a full, clear, and exact description thereof, reference being had to the accompanying drawings, making a part of this specification, in which—

Figure 1 is an inside view of the molds for producing the body of the jar-cover. Fig. 2 are the molds for producing the knobs of the covers. Fig. 3 shows a section through a jar-cover before it is removed from the two molds. Fig. 4 is a sectional view of a jar before it is removed from the molds. Fig. 5 is a view of the finished article.

Similar letters of reference indicate corresponding parts in the several figures.

The object of this invention is to produce glass ring-jars and the covers therefor by means of molds which are so constructed that the rings or annular elevations upon the exterior surfaces of the jars and covers shall be formed during the act of blowing the glass in said molds, as will be hereinafter described.

To enable others skilled in the art to understand this invention, we will describe its construction and operation.

In the accompanying drawings, Fig. 5, we have represented a ring-jar, A, and its cover B, having annular elevations $a$ $a'$ formed upon their exterior surfaces in the act of producing the glass.

The mold for producing the jar A is shown in Fig. 4. It consists of two semi-cylindrical sections, C C$^1$, which are hinged together and provided with arms or handles $b$ $b$. The interior of this mold is of a shape corresponding to the external shape of the jars produced therein, with the exception that the upper portion of the mold is contracted, for the purpose of receiving the surplus glass, as shown in the drawings.

The section C$^1$ of the mold has a circular base, C$^2$, formed on it, the upper surface of which is convex, for producing the concavity in the bottom of the jar. This mold is constructed for producing jars with two annular rings, $a$; but if a greater number of rings are required, it is only necessary to increase the number of grooves in the mold. The opening, which is through the top of the mold when the two sections are together, is for the purpose of introducing the blow-pipe and glass.

The molds for producing the covers for the jars are represented in Figs. 1, 2, and 3. D D represent two semi-cylindrical sections, which are hinged together and provided with handles, as described for Fig. 4. On top of this mold an elevation, D', is formed, which is undercut in such manner as to fit snugly into and be held by the two semi-cylindrical sections E E, as shown in Fig. 3. Within this elevated portion D' an opening is made for receiving the glass which forms the knob on the top of the cover, as shown in Fig. 2.

The two semi-cylindrical sections E E form the body of the cover, and are constructed with a contracted upper portion for receiving the surplus glass or "blow-over," and also with sharp angles at $e$ $e$, Figs. 1 and 3, for the purpose of having the glass thin at this point, so that it will break off readily and evenly.

The operation of making the jars and covers is as follows: The workman forms the hot glass on the end of a blow-pipe into a suitable shape, and introduces the glass into the mold of Fig. 4. The two sections of this mold are then closed and firmly secured while the workman blows the glass and makes it conform to the shape of the interior of the mold.

When the jar is thus formed it is taken out of the mold, and with a little hot glass on the end of a punty the jar is struck up, and its mouth reheated and opened wide enough to receive the lower edge of the cover B. This reheating of the jars after they have been removed from the mold gives a fire polish or finish to them, which makes them look like a hand-made article.

It will be seen that the rings are formed on the jars in the mold, and that these rings are slightly concave inside, upon which surfaces any color may be applied which will give the rings the appearance of those which are made of colored glass. Under the old plan these rings are applied after the jars are properly shaped, and the glass of which they are made requires to be colored. We construct the jars of glass of one color, and can give any color to the rings which may be desired.

The covers B are formed by first putting a small quantity of glass in the mold of Fig. 2, and then bringing the two molds of Figs. 1 and 2 together, as shown in Fig. 3, after which the workman introduces the proper quantity of glass on the end of a pipe into the mold E and firmly closes its sections. He then forms the cover as described for molding the jars. The blow-over or surplus glass on the covers is then broken off, when the rings $a$ on them can be colored, as above described.

By the above process, and by a change in the shape of the molds, footed bowls, urns, salvers, and other analogous articles can be made of glass with great facility, and they can be made by ordinary workmen at a much less cost than articles of a similar kind can be made by the hand process.

Having thus described our invention, what we claim as new, and desire to secure by Letters Patent, is—

The arrangement of the parts forming a mold for producing jars and other articles of glass, substantially as herein described.

J. S. ATTERBURY.
      T. B. ATTERBURY.

Witnesses:
 E. G. KREHAN,
 A. B. STEVENSON.